US012684479B2

(12) United States Patent
Koskinen et al.

(10) Patent No.: US 12,684,479 B2
(45) Date of Patent: Jul. 14, 2026

(54) EXTENSIONS OF WUS FOR PAGING FOR RRC INACTIVE

(71) Applicant: Nokia Technologies Oy, Espoo (FI)

(72) Inventors: Jussi-Pekka Koskinen, Oulu (FI); Daniela Laselva, Klarup (DK); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 639 days.

(21) Appl. No.: 17/797,871

(22) PCT Filed: Feb. 23, 2021

(86) PCT No.: PCT/EP2021/054408
§ 371 (c)(1),
(2) Date: Aug. 5, 2022

(87) PCT Pub. No.: WO2021/185538
PCT Pub. Date: Sep. 23, 2021

(65) Prior Publication Data
US 2023/0022160 A1 Jan. 26, 2023

Related U.S. Application Data

(60) Provisional application No. 62/992,195, filed on Mar. 20, 2020.

(51) Int. Cl.
*H04W 52/02* (2009.01)
*H04W 72/23* (2023.01)
(Continued)

(52) U.S. Cl.
CPC ....... *H04W 52/0229* (2013.01); *H04W 72/23* (2023.01); *H04W 76/19* (2018.02); *H04W 76/20* (2018.02)

(58) Field of Classification Search
CPC . H04W 52/0229; H04W 72/23; H04W 76/19; H04W 76/20; H04W 52/0235; Y02D 30/70
See application file for complete search history.

(56) References Cited

U.S. PATENT DOCUMENTS

| | | | |
|---|---|---|---|
| 2020/0015263 A1 * | 1/2020 | Huang .............. | H04W 72/0446 |
| 2020/0092814 A1 * | 3/2020 | Zhou ................. | H04W 52/0235 |

(Continued)

FOREIGN PATENT DOCUMENTS

| | | | | |
|---|---|---|---|---|
| WO | WO-2018204799 A1 * | 11/2018 | ........... | H04L 5/0051 |
| WO | 2021/148711 A1 | 7/2021 | | |

OTHER PUBLICATIONS

"New WID: UE Power Saving in NR", 3GPP TSG RAN Meetings #84, RP-191607, Agenda: 9.4.6, CATT, Jun. 3-6, 2019, 5 pages.

(Continued)

*Primary Examiner* — Mohammad S Adhami
(74) *Attorney, Agent, or Firm* — Lippes Mathias LLP

(57) ABSTRACT

In accordance with example embodiments of the invention there is a method and apparatus to perform at least detecting, by a network device of a communication network, a wake-up signal related message format comprising control information, wherein the network device is in a radio resource control inactive state; and based on the detected message format, performing operations to initiate a connection resume procedure in the communication network. Further, in accordance with example embodiments of the invention there is a method and apparatus to perform at least determining, by a network node of a communication network, a wake-up signal related message format comprising control information for at least one network device in a radio resource control inactive state; and based on the determining, sending towards the at least one network device the message format to cause the at least one network device to (Continued)

UE IN RRC INACTIVE WITH STORED UE AS INACTIVE CONTEXT, RESUME ID (I–RNTI) & WUS CONFIGURATION(S) INCL. ONE OR MORE PS–RNTI(S) ⌐210

218

WUS INCL. UL GRANT RECEIVED TARGETED TO PS–RNTI & I–RNTI ? 215

NO

YES ⌐220

225 TA VALID ? NO 230

YES

233 UE TRIGGERS A RRC CONNECTION RESUME PROCEDURE BY INITIATING A RANDOM ACCESS PROCEDURE

235

UE TRIGGERS A RRC CONNECTION RESUME PROCEDURE USING THE UL GRANT INFORMATION INDICATED IN THE WUS, WITHOUT INITIATING A RANDOM ACCESS PROCEDURE ⌐235 perform operations to initiate a connection resume procedure in the communication network.

7 Claims, 4 Drawing Sheets

(51) Int. Cl.
H04W 76/19 (2018.01)
H04W 76/20 (2018.01)

(56) References Cited

U.S. PATENT DOCUMENTS

| | | | | |
|---|---|---|---|---|
| 2020/0145921 A1* | 5/2020 | Zhang | ............... | H04W 52/0235 |
| 2020/0213943 A1* | 7/2020 | Medles | ............. | H04W 52/0216 |
| 2020/0351780 A1* | 11/2020 | Liao | ....................... | H04W 76/28 |
| 2020/0351931 A1* | 11/2020 | Babaei | ................ | H04W 52/365 |
| 2021/0195546 A1* | 6/2021 | Lei | ......................... | H04W 76/19 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"3rd Generation Partnership Project; Technical Specification Group Radio Access Network; NR; User Equipment (UE) procedures in Idle mode and RRC Inactive state (Release 15)", 3GPP TS 38.304, V15.6.0, Dec. 2019, pp. 1-30.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Services and System Aspects; Feasibility study on 5G message service for MIOT; Stage 1 (Release 16)", 3GPP TR 22.824, V16.0.0, Sep. 2018, pp. 1-27.

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

"Response-driven paging to reduce beam sweeping overhead in NR", 3GPP TSG-RAN WG2 Ad Hoc on NR#2, R2-1706638, Agenda: 10.4.2.6, Ericsson, Jun. 27-29, 2017, pp. 1-3.

International Search Report and Written Opinion received for corresponding Patent Cooperation Treaty Application No. PCT/EP2021/054408, dated Jun. 8, 2021, 9 pages.

* cited by examiner

THE RRC STATE MACHINE IN 5G NR

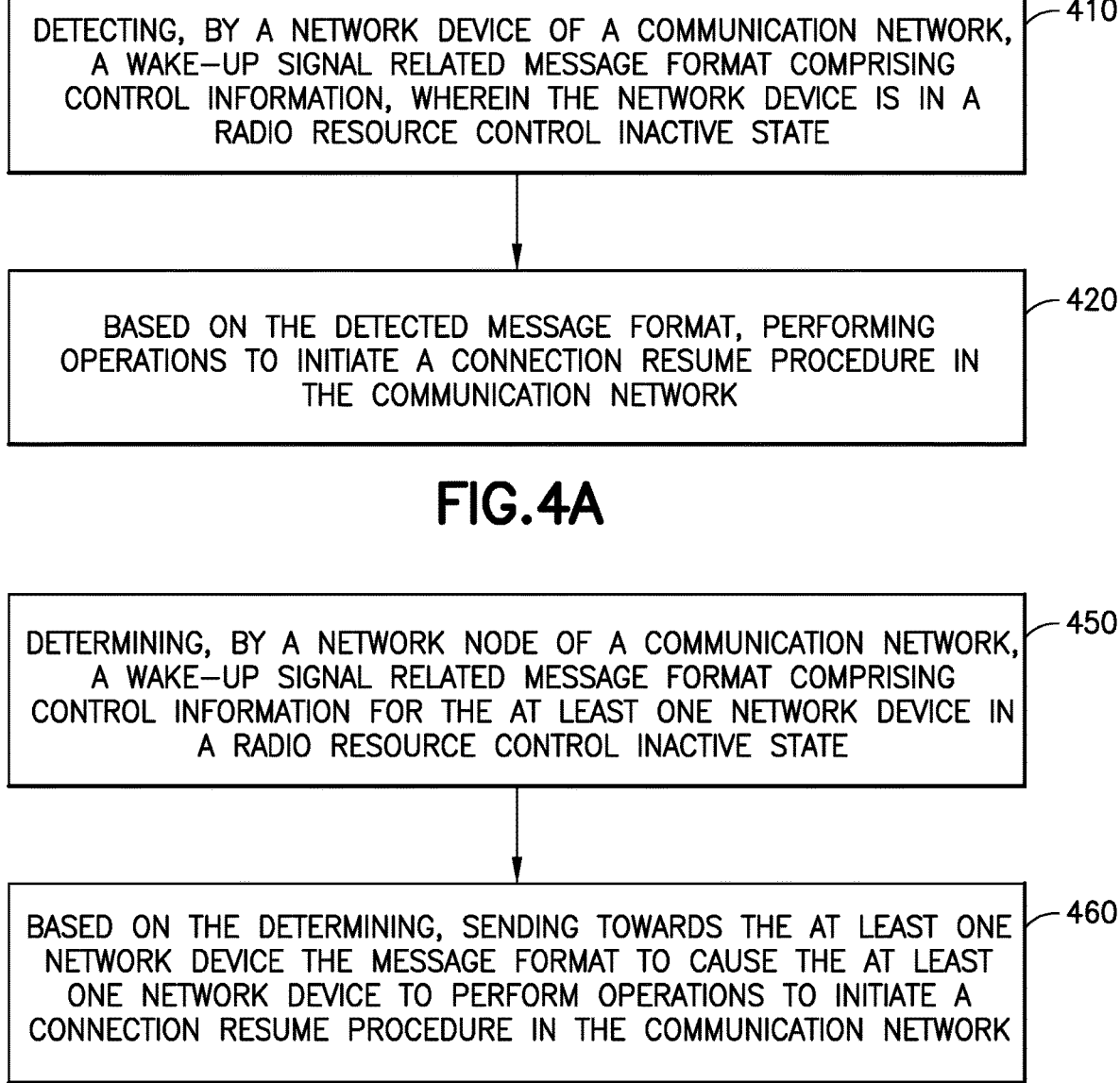

DETECTING, BY A NETWORK DEVICE OF A COMMUNICATION NETWORK, A WAKE-UP SIGNAL RELATED MESSAGE FORMAT COMPRISING CONTROL INFORMATION, WHEREIN THE NETWORK DEVICE IS IN A RADIO RESOURCE CONTROL INACTIVE STATE ⌐410

BASED ON THE DETECTED MESSAGE FORMAT, PERFORMING OPERATIONS TO INITIATE A CONNECTION RESUME PROCEDURE IN THE COMMUNICATION NETWORK ⌐420

FIG.4A

DETERMINING, BY A NETWORK NODE OF A COMMUNICATION NETWORK, A WAKE-UP SIGNAL RELATED MESSAGE FORMAT COMPRISING CONTROL INFORMATION FOR THE AT LEAST ONE NETWORK DEVICE IN A RADIO RESOURCE CONTROL INACTIVE STATE ⌐450

BASED ON THE DETERMINING, SENDING TOWARDS THE AT LEAST ONE NETWORK DEVICE THE MESSAGE FORMAT TO CAUSE THE AT LEAST ONE NETWORK DEVICE TO PERFORM OPERATIONS TO INITIATE A CONNECTION RESUME PROCEDURE IN THE COMMUNICATION NETWORK ⌐460

FIG.4B

EXTENSIONS OF WUS FOR PAGING FOR RRC INACTIVE

RELATED APPLICATION

This application was originally filed as PCT Application No. PCT/EP2021/054408, filed on Feb. 23, 2021, which claims priority from U.S. Provisional Application No. 62/992,195, filed Mar. 20, 2020, each of which is incorporated herein by reference in its entirety.

TECHNICAL FIELD

The teachings in accordance with the exemplary embodiments of this invention relate generally to extensions to a WUS signal and, more specifically, relate to a format message comprising extensions to a WUS signal to identify a validity of the WUS for particular device(s).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

BWP Bandwidth Part
CFRA Contention Free RACH
CP Control Plane
CRC Cyclic Redundancy Check
C-RNTI Cell Radio Network Temporary Identifier
CSI Channel-state information
DCI Downlink Control Information
DCP DCI with CRC scrambled by PS-RNTI
DRX Discontinuous reception
eMBB Enhanced Mobile Broadband
ETWS Earthquake & Tsunami Warning System
IOT Internet of Things
I-RNTI Inactive-RNTI
MIoT Mobile IOT
MMTC Massive Machine Type Communication
MSG Message
NG-5G-S-TMSI 5G S-Temporary Mobile Subscriber Identity
NR New Radio
PCell Primary Cell
PDCCH Physical Downlink Control Channel
PDSCH Physical downlink shared channel
PRACH Physical Random Access Channel
PRB physical resource block
PUCCH Physical Uplink Control Channel
PUSCH Physical Uplink shared channel
PS-RNTI Power saving-RNTI
RA Random Access
RACH Random Access Channel
RAR Re-Authorization Request
RNA RAN Notification Area
RNTI Radio Network Temporary Identifier
RRC Radio resource control protocol
RRM Radio resource management
RSRP Reference Signal Received Power
TC-RNTI Temporary C-RNTI SDT Session Description Protocol
SS Synchronization Signal
SSB Synchronization Signal Block In wireless communication systems, power saving performance has always been valued. With the development of communications technologies there is due to a large number or limitations of devices, it is necessary to improve power saving requirements for such devices.

Traditional wireless local area networks (WLAN) systems and cellular network systems have corresponding power saving mechanisms. When no communication needs to be performed, the terminal device enters a sleep state and wakes up to receive information at a predetermined time.

Power saving mechanisms for such power saving performance uses a wake-up signal (WUS) to indicate to particular device(s) a time wake up and receive information to initiate communications for scheduled data at a next or upcoming on-duration for the particular device(s).

Example embodiments of the invention work to improve at least operations associated with these requirements in present and further communications technologies at the time of this application.

SUMMARY

In an example aspect of the invention, there is a method comprising detecting, by a network device of a communication network, a wake-up signal related message format comprising control information, wherein the network device is in a radio resource control inactive state; and based on the detected message format, performing operations to initiate a connection resume procedure in the communication network.

A further example embodiment is a method comprising the method of the previous paragraph, wherein the control information of the message format is using a subset of information to provide an uplink grant for use by the network device in the radio resource control inactive state to initiate the connection resume procedure in the communication network, wherein the subset of information comprises indications of uplink radio resources for the uplink grant for use by the network device to perform the operations to initiate the connection resume procedure, wherein the subset of information of the message format is received over a downlink control information format, wherein the downlink control information format comprises at least one of a downlink control information format 0, a downlink control information format 1, or a downlink control information format 2_6, wherein the subset of information comprises an indication of at least one physical resource block of a physical uplink shared channel for the connection resume procedure request transmission, wherein the message format is indicating an activation of preconfigured uplink radio resources for use to perform operations to initiate the connection resume procedure in the communication network, wherein there is determining, by the network device, a timing advance validity based on reception of the message format, wherein the message format indicating the activation of preconfigured uplink radio resources is determined to be applicable to the network device based on determining the timing advance validity, wherein the determining the timing advance validity is based on at least comparing characteristics of the message as received to one or more previous valid messages, wherein the comparing is comparing at least one of a signal strength or a timing of the message as received to the one or more previous valid messages for the network device, wherein the comparing is based on comparing a timing of reception of the message as received to an estimate of timing for a message occasion associated with the wake-up signal, wherein the message format comprises an indication of at least one of a network device specific identifier or a group specific identifier, wherein there is triggering, by the network device, the connection resume operation in response to the message format being targeted to at least one of a configured network device specific identifier or a configured group specific identifier associated with the network device, wherein for a case the operations to initiate the connection resume procedure comprises a random access procedure, the message format indicates contention free random access resources for the network device, wherein the contention free random access resources are using at least one of a 4-step contention free random access preamble or a 2-step contention free random access MSGA, wherein the message format is using a downlink control information format of a physical downlink control channel to indicate the contention free random access resources for the network device, wherein there is promoting, by the network device, a temporary cell radio network temporary identifier, received in a random access response, as a cell radio network temporary identifier, wherein the contention free random access resources are using a 2-step contention free random access MSGA, and there is decoding, by the network device, a MSGB radio network temporary identifier for one of a fallback random access response or a success random access response, and wherein the message format comprises an indication of at least one beam in which uplink resources are valid for the connection resume procedure in the communication network.

A non-transitory computer-readable medium storing program code, the program code executed by at least one processor to perform at least the method as described in the paragraphs above.

In an example aspect of the invention, there is an apparatus, such as a user equipment side apparatus, comprising: at least one processor; and at least one memory including computer program code, where the at least one memory and the computer program code are configured, with the at least one processor, to cause the apparatus to at least: detect, by a network device of a communication network, a wake-up signal related message format comprising control information, wherein the network device is in a radio resource control inactive state; and based on the detected message format, perform operations to initiate a connection resume procedure in the communication network.

A further example embodiment is an apparatus comprising the apparatus of the previous paragraph, wherein the control information of the message format is using a subset of information to provide an uplink grant for use by the network device in the radio resource control inactive state to initiate the connection resume procedure in the communication network, wherein the subset of information comprises indications of uplink radio resources for the uplink grant for use by the network device to perform the operations to initiate the connection resume procedure, wherein the subset of information of the message format is received over a downlink control information format, wherein the downlink control information format comprises at least one of a downlink control information format 0, a downlink control information format 1, or a downlink control information format 2_6, wherein the subset of information comprises an indication of at least one physical resource block of a physical uplink shared channel for the connection resume procedure request transmission, wherein the message format is indicating an activation of preconfigured uplink radio resources for use to perform operations to initiate the connection resume procedure in the communication network, wherein there is determining, by the network device, a timing advance validity based on reception of the message format, wherein the message format indicating the activation of preconfigured uplink radio resources is determined to be applicable to the network device based on determining the timing advance validity, wherein the determining the timing advance validity is based on at least comparing characteristics of the message as received to one or more previous valid messages, wherein the comparing is comparing at least one of a signal strength or a timing of the message as received to the one or more previous valid messages for the network device, wherein the comparing is based on comparing a timing of reception of the message as received to an estimate of timing for a message occasion associated with the wake-up signal, wherein the message format comprises an indication of at least one of a network device specific identifier or a group specific identifier, wherein the at least one memory including the computer program code is configured with the at least one processor to cause the apparatus to trigger, by the network device, the connection resume operation in response to the message format being targeted to at least one of a configured network device specific identifier or a configured group specific identifier associated with the network device, wherein for a case the operations to initiate the connection resume procedure comprises a random access procedure, the message format indicates contention free random access resources for the network device, wherein the contention free random access resources are using at least one of a 4-step contention free random access preamble or a 2-step contention free random access MSGA, the message format is using a downlink control information format of a physical downlink control channel to indicate the contention free random access resources for the network device, wherein the at least one memory including the computer program code is configured with the at least one processor to cause the apparatus to promote, by the network device, a temporary cell radio network temporary identifier, received in a random access response, as a cell radio network temporary identifier, wherein the contention free random access resources are using a 2-step contention free random access MSGA, wherein the at least one memory including the computer program code is configured with the at least one processor to cause the apparatus to decode, by the network device, a MSGB radio network temporary identifier for one of a fallback random access response or a success random access response, wherein the message format comprises an indication of at least one beam in which uplink resources are valid for the connection resume procedure in the communication network.

In an example aspect of the invention, there is an apparatus, such as a user equipment side apparatus, comprising: means for detecting, by a network device of a communication network, a wake-up signal related message format comprising control information, wherein the network device is in a radio resource control inactive state; and means, based on the detected message format, for performing operations to initiate a connection resume procedure in the communication network.

A further example embodiment is an apparatus comprising the apparatus of the previous paragraph, wherein the control information of the message format is using a subset of information to provide an uplink grant for use by the network device in the radio resource control inactive state to initiate the connection resume procedure in the communication network, wherein the subset of information comprises indications of uplink radio resources for the uplink grant for use by the network device to perform the operations to initiate the connection resume procedure, wherein the subset of information of the message format is received over a downlink control information format, wherein the downlink control information format comprises at least one of a downlink control information format 0, a downlink control information format 1, or a downlink control information format 2_6, wherein the subset of information comprises an indication of at least one physical resource block of a physical uplink shared channel for the connection resume procedure request transmission, wherein the message format is indicating an activation of preconfigured uplink radio resources for use to perform operations to initiate the connection resume procedure in the communication network, wherein there is means for determining, by the network device, a timing advance validity based on reception of the message format, wherein the message format indicating the activation of preconfigured uplink radio resources is determined to be applicable to the network device based on determining the timing advance validity, wherein the determining the timing advance validity is based on at least comparing characteristics of the message as received to one or more previous valid messages, wherein the comparing is comparing at least one of a signal strength or a timing of the message as received to the one or more previous valid messages for the network device, wherein the comparing is based on comparing a timing of reception of the message as received to an estimate of timing for a message occasion associated with the wake-up signal, wherein the message format comprises an indication of at least one of a network device specific identifier or a group specific identifier, wherein there is means for triggering, by the network device, the connection resume operation in response to the message format being targeted to at least one of a configured network device specific identifier or a configured group specific identifier associated with the network device, wherein for a case the operations to initiate the connection resume procedure comprises a random access procedure, the message format indicates contention free random access resources for the network device, wherein the contention free random access resources are using at least one of a 4-step contention free random access preamble or a 2-step contention free random access MSGA, wherein the message format is using a downlink control information format of a physical downlink control channel to indicate the contention free random access resources for the network device, wherein there is means for promoting, by the network device, a temporary cell radio network temporary identifier, received in a random access response, as a cell radio network temporary identifier, wherein the contention free random access resources are using a 2-step contention free random access MSGA, and there is means for decoding, by the network device, a MSGB radio network temporary identifier for one of a fallback random access response or a success random access response, and wherein the message format comprises an indication of at least one beam in which uplink resources are valid for the connection resume procedure in the communication network.

In accordance with the example embodiments as described in the paragraph above, at least the means for detecting, performing, determining, triggering, promoting, and decoding comprises a network interface, and computer program code stored on a computer-readable medium and executed by at least one processor.

In another example aspect of the invention, there is a method comprising method, comprising: determining, by a network node of a communication network, a wake-up signal related message format comprising control information for at least one network device in a radio resource control inactive state; and based on the determining, sending towards the at least one network device the message format to cause the at least one network device to perform operations to initiate a connection resume procedure in the communication network.

A further example embodiment is a method comprising the method of the previous paragraph, wherein the control information of the message format is using a subset of information to provide an uplink grant for the at least one network device in the radio resource control inactive state to initiate the connection resume procedure in the communication network, wherein the subset of information comprises indications of uplink radio resources for the uplink grant for the at least one network device to perform the operations to initiate the connection resume procedure, wherein the subset of information of the message format is transmitted over a downlink control information format, wherein the downlink control information format comprises at least one of a downlink control information format 0, a downlink control information format 1, or a downlink control information format 2_6, wherein the subset of information comprises an indication of at least one physical resource block of a physical uplink shared channel for the connection resume procedure request transmission, wherein the message format is indicating an activation of preconfigured uplink radio resources for use to perform operations to initiate the connection resume procedure in the communication network, wherein the message format indicating the activation of preconfigured uplink radio resources is determined to be applicable to the at least one network device based on a timing advance validity of the at least one network device, wherein the message format comprises an indication of at least one of a network device specific identifier or a group specific identifier, wherein the message format is targeted to at least one of a configured network device specific identifier or a configured group specific identifier associated with the at least one network device, wherein for a case the operations to initiate the connection resume procedure require a random access procedure, the message format indicates contention free random access resources for the at least one network device, wherein the contention free random access resources are using at least one of a 4-step contention free random access preamble or a 2-step contention free random access MSGA, wherein the message format is using one of a downlink control information format or a physical downlink control channel to indicate the contention free random access resources for the at least one network device, wherein the message format comprises an indication of at least one beam in which uplink resources are valid for the connection resume procedure in the communication network.

A non-transitory computer-readable medium storing program code, the program code executed by at least one processor to perform at least the method as described in the paragraphs above.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a communication network, a wake-up signal related message format comprising control information for at least one network device in a radio resource control inactive state; and based on the determining, send towards the at least one network device the message format to cause the at least one network device to perform operations to initiate a connection resume procedure in the communication network.

A further example embodiment is an apparatus comprising the apparatus of the previous paragraph, wherein the control information of the message format is using a subset of information to provide an uplink grant for the at least one network device in the radio resource control inactive state to initiate the connection resume procedure in the communication network, wherein the subset of information comprises indications of uplink radio resources for the uplink grant for the at least one network device to perform the operations to initiate the connection resume procedure, wherein the subset of information of the message format is transmitted over a downlink control information format, wherein the downlink control information format comprises at least one of a downlink control information format 0, a downlink control information format 1, or a downlink control information format 2_6, wherein the subset of information comprises an indication of at least one physical resource block of a physical uplink shared channel for the connection resume procedure request transmission, wherein the message format is indicating an activation of preconfigured uplink radio resources for use to perform operations to initiate the connection resume procedure in the communication network, wherein the message format indicating the activation of preconfigured uplink radio resources is determined to be applicable to the at least one network device based on a timing advance validity of the at least one network device, wherein the message format comprises an indication of at least one of a network device specific identifier or a group specific identifier, wherein the message format is targeted to at least one of a configured network device specific identifier or a configured group specific identifier associated with the at least one network device, wherein for a case the operations to initiate the connection resume procedure require a random access procedure, the message format indicates contention free random access resources for the at least one network device, wherein the contention free random access resources are using at least one of a 4-step contention free random access preamble or a 2-step contention free random access MSGA, wherein the message format is using one of a downlink control information format or a physical downlink control channel to indicate the contention free random access resources for the at least one network device, and wherein the message format comprises an indication of at least one beam in which uplink resources are valid for the connection resume procedure in the communication network.

In an example aspect of the invention, there is an apparatus, such as a network side apparatus, comprising: means for determining, by a network node of a communication network, a wake-up signal related message format comprising control information for at least one network device in a radio resource control inactive state; and means, based on the determining, for sending towards the at least one network device the message format to cause the at least one network device to perform operations to initiate a connection resume procedure in the communication network.

A further example embodiment is an apparatus comprising the apparatus of the previous paragraph, wherein the control information of the message format is using a subset of information to provide an uplink grant for the at least one network device in the radio resource control inactive state to initiate the connection resume procedure in the communication network, wherein the subset of information comprises indications of uplink radio resources for the uplink grant for the at least one network device to perform the operations to initiate the connection resume procedure, wherein the subset of information of the message format is transmitted over a downlink control information format, wherein the downlink control information format comprises at least one of a downlink control information format 0, a downlink control information format 1, or a downlink control information format 2_6, wherein the subset of information comprises an indication of at least one physical resource block of a physical uplink shared channel for the connection resume procedure request transmission, wherein the message format is indicating an activation of preconfigured uplink radio resources for use to perform operations to initiate the connection resume procedure in the communication network, wherein the message format indicating the activation of preconfigured uplink radio resources is determined to be applicable to the at least one network device based on a timing advance validity of the at least one network device, wherein the message format comprises an indication of at least one of a network device specific identifier or a group specific identifier, wherein the message format is targeted to at least one of a configured network device specific identifier or a configured group specific identifier associated with the at least one network device, wherein for a case the operations to initiate the connection resume procedure require a random access procedure, the message format indicates contention free random access resources for the at least one network device, wherein the contention free random access resources are using at least one of a 4-step contention free random access preamble or a 2-step contention free random access MSGA, wherein the message format is using one of a downlink control information format or a physical downlink control channel to indicate the contention free random access resources for the at least one network device, and wherein the message format comprises an indication of at least one beam in which uplink resources are valid for the connection resume procedure in the communication network.

In accordance with the example embodiments as described in the paragraph above, at least the means for determining and sending comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 4A and FIG. 4B each show a method in accordance with example embodiments of the invention which may be performed by an apparatus.

DETAILED DESCRIPTION

In accordance with example embodiments of the invention, there is proposed at least a format message comprising extensions to a WUS signal to identify a validity of the WUS for particular device(s).

3GPP has defined a PDCCH-based power saving signal/channel to instruct the UE to wake up at the next DRX On-Duration for RRC Connected UEs. Recently RAN1 denoted such signal/channel as DCP ("DCI with CRC scrambled by PS-RNTI"), where PS stands for Power Saving and the used DCI format is 2_6. For simplicity, we will denote it for WUS (Wake Up Signal) as it is indeed used to indicate to the UE to initiate PDCCH monitoring (wake up) for scheduled data at the coming On-Duration. If a UE does not receive the WUS indication of wake-up during the network-defined WUS occasion(s), it will assume there is no data and can skip monitoring the PDCCH during the next DRX On-Duration, thus saving power can be achieved when no data is present. To minimize false alarms (leading to waking up a UE unnecessarily), the WUS signal is targeted to a UE specific identifier, the PS-RNTI. It is noted that the WUS design is still under discussion in the work item on UE power saving in NR in conjunction with DRX. This invention relates to extensions of WUS to RRC Inactive state and relates to a prior WID release follow-up on the UE power saving in NR, whose scope includes power saving enhancements for RRC Inactive. It should be readily understood that any reference to WUS may be understood as referring to DCP hereinafter.

A relevant objective is as follows:

Specify enhancements for idle/inactive-mode UE power saving, considering system performance aspects [RAN2, RAN1]:

1A. Study and specify paging enhancement(s) to reduce unnecessary UE paging receptions, subject to no impact to legacy UEs [RAN2, RAN1]

Figure 1:
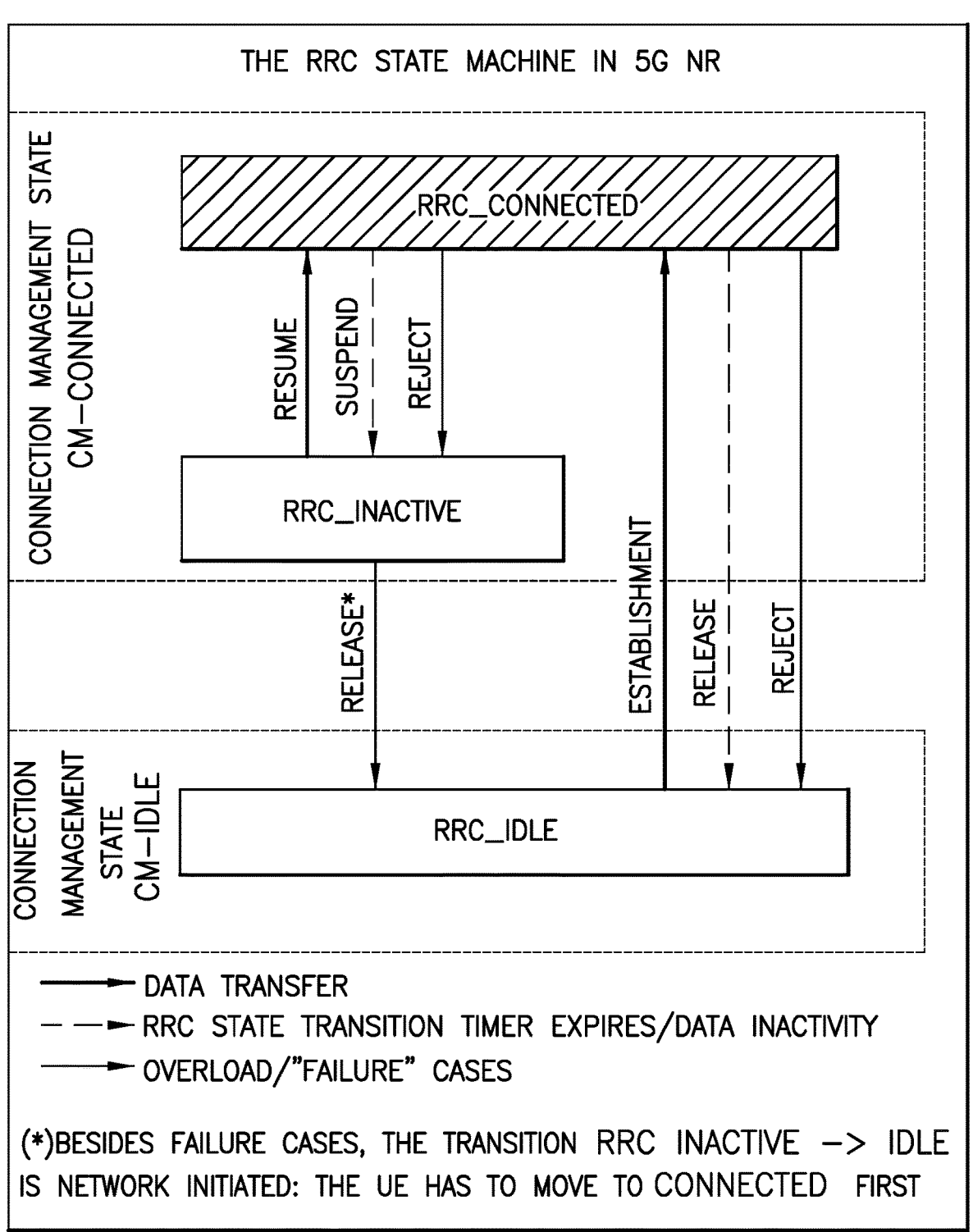
FIG. 1 shows a New Radio Resource Control Protocol State machine with Radio Resource Control state transitions.

NOTE: RAN1 to check and update, if needed, evaluation methodology in RAN1 #100 meeting RRC Inactive (or RRC_INACTIVE) is a new independent RRC state that was introduced in a prior release of 3GPP NR, complementing the existing states, RRC_CONNECTED and RRC_IDLE, with the goal of lean signalling and energy-efficient support of NR services, as previously submitted. The NR RRC state machine comprising the three states is illustrated in FIG. 1. Where for an RRC state machine in 5G or NR a UE is either in RRC_CONNECTED state or in RRC_INACTIVE state when an RRC connection has been established. If this is not the case, i.e. no RRC connection is established, the UE is in RRC_IDLE state.

FIG. 1 shows a New Radio Resource Control Protocol State machine with Radio Resource Control state transitions. As shown in FIG. 1, there is a transition between an RRC_CONNECTED and RRC_INACTIVE, the transition during a CM-Connected mode that is based on a Resume, Suspend, and Reject operation as shown in FIG. 1. Further, a transition the RRC_INACTIVE of the CM-Connected mode to RRC_IDLE of a CM-Idle mode, the transition based on Release operation as shown in FIG. 1. Further, there is a transition between an RRC_CONNECTED of CM Connected mode and RRC_IDLE of a CM IDLE mode, the transition based on an Establishment, Release, and a Reject operation as shown in FIG. 1. In addition, as shown in FIG. 1 the operations include data transfer, RRC state transition timer expiration/data inactivity, and overload/failure cases.

Besides failure cases, the transition RRC_INACTIVE to IDLE is network initiated, and the UE has moved to CONNECTED mode first.

Although, the design was conceived particularly for mMTC/mIoT services, it could be beneficial to efficiently deliver small/infrequent traffic of eMBB and URLLC services as well. The RRC_INACTIVE state enables to quickly resume the RRC connection and start the transmission of small or sporadic data with a much lower initial access delay and associated signalling overhead as compared to the RRC_IDLE state (by allowing a faster transition to RRC_CONNECTED having ~10 ms CP delay). This is achieved mainly thanks to reduced control signalling required for requesting and obtaining the resume of a suspended RRC connection, which results in UE power saving. At the same time, a UE in RRC_INACTIVE is able to achieve similar power savings as in RRC_IDLE, benefiting from e.g. a much larger period of PDCCH monitoring (e.g. paging) and relaxed measurements (e.g. for cell (re)-selection) compared to RRC_CONNECTED.

Furthermore, compared to keeping the UE in RRC_CONNECTED state, the new state minimizes mobility signalling both to RAN (e.g. RRC measurement reporting, HO messages) and to the core network (e.g. to/from the AMF) since the UE is still in CM-CONNECTED state. A UE in RRC_INACTIVE state can move within an area configured by RAN without any notification (i.e. RAN Notification Area (RNA)) and using a unique identifier, for example the Inactive-RNTI (I-RNTI). This RNA can cover a single or multiple cell(s) and shall be contained within the CN registration area. A RAN-based Notification Area Update (RNAU) procedure is run by the UE periodically and when the UE re-selects to a cell that does not belong to the configured RNA.

In a prior release there is a WI entitled "NR small data transmissions in INACTIVE state." The main motivation for this WI is to avoid the signalling overhead and delay associated with transition from RRC_INACTIVE to RRC_CONNECTED to perform a short data transmission. This functionality is important, since the motivation to introduce the RRC_INACTIVE state was to be able to transition UEs with infrequent data transmission to a state with minimum signalling overhead and power consumption. One approved version of the objectives of this WI at the time of this application is as follows:

1. For the RRC_INACTIVE state:
    1. UL small data transmissions for RACH-based schemes (i.e. 2-step and 4-step RACH):
    2. Transmission of UL data on pre-configured PUSCH resources (i.e. reusing the configured grant type 1)—when TA is valid
        1. General procedure for small data transmission over configured grant type 1 resources from INACTIVE state [RAN2].

Configuration of the configured grant type1 resources for small data transmission in UL for INACTIVE state [RAN2]

According to the above objectives, of interest to the solution described in this invention report is the fact that three different SDT solutions will be supported for enabling SDT in a prior release, which we'll refer thereafter as follows:

2-step RACH based SDT—The MsgA PUSCH is used to transmit the SDT payload;

2. 4-step RACH based SDT—The Msg3 (PUSCH) is used to transmit the SDT payload; and 3. Configured Grant-based SDT—The SDT payload can be sent on pre-configured PUSCH resources extending Configured Grant type 1 when it has a valid TA.

In a prior submission associated with the Applicant, a "WUS for paging" for RRC Inactive UEs was disclosed. The reception of such UE-specific WUS triggers a connection resume for the UE (contrary to triggering PDCCH monitoring for paging during the subsequent paging cycle as in regular WUS).

In the legacy resume, the UE will initiate a random-access procedure. However, in scenarios when the time alignment (TA) is valid, the random-access procedure could be avoided as decided within a SDT work item release as indicated herein. On the other hand, in scenarios where the network has identified congestion in CBRA RACH (contention based random access channel) and it frequently needs to issue a back off for UEs accessing via the RACH to the network, this makes UEs that do not have valid TA available difficult to be served in a fast manner—especially, if delay sensitive data becomes available in the network for such UE. If no random access procedure takes place, means to indicate to the UE on which resources the uplink payload should be transmitted may be missing. This invention proposes extensions to the "WUS for paging" indication to solve this problem. Furthermore, for UEs not having valid TA available, extensions are proposed to the "WUS for paging" how such UEs could be served in a fast manner.

Figure 3:
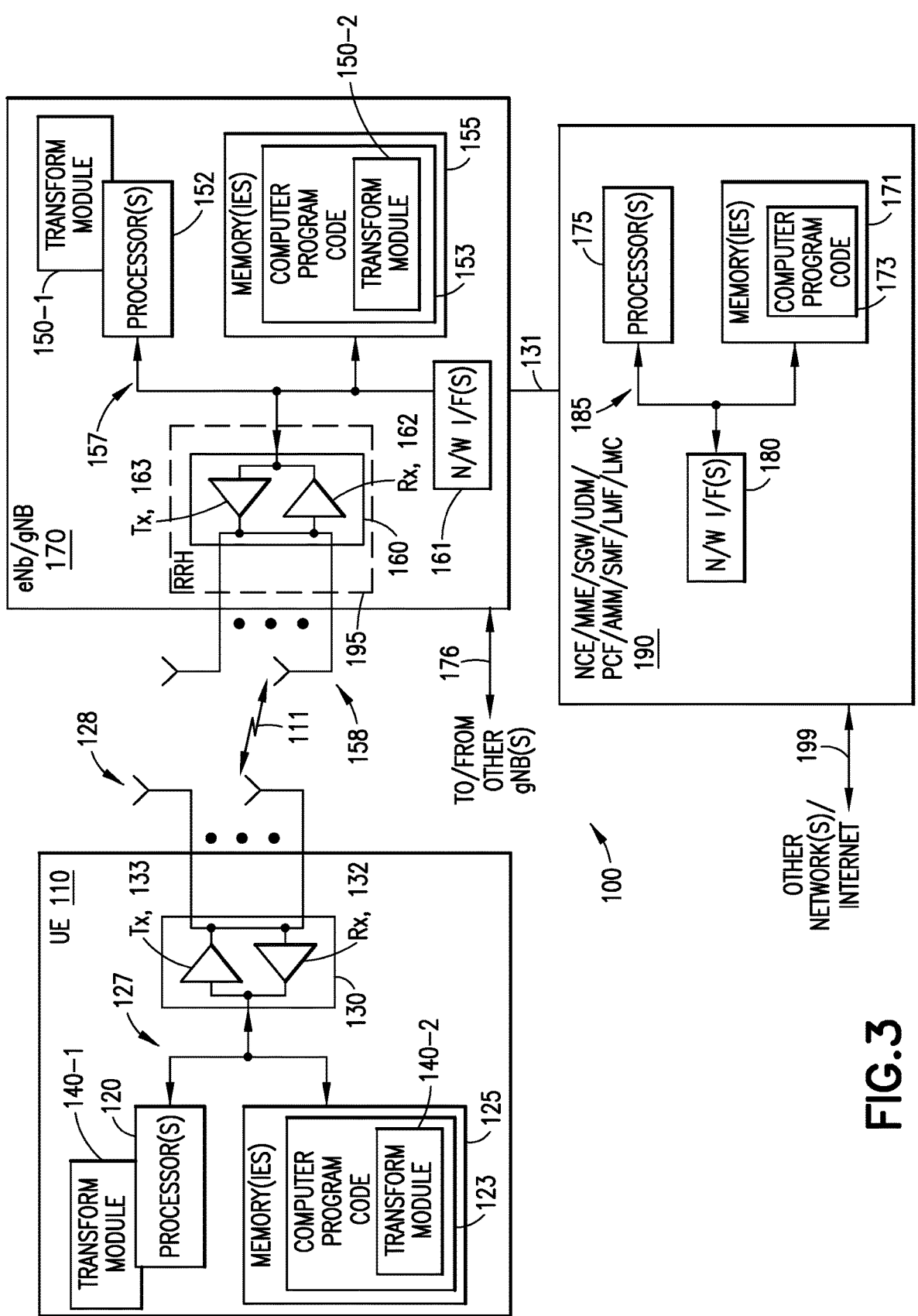
FIG. 3 shows a high level block diagram of various devices used in carrying out various aspects of the invention.

Before describing the example embodiments of the invention in further detail reference is made to FIG. 3. FIG. 3 shows a block diagram of one possible and non-limiting exemplary system in which the exemplary embodiments may be practiced.

As shown in FIG. 3, a user equipment (UE) 110 is in wireless communication with a wireless network 100, such as an LTE, 5G, and/or NR network. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a WUS module 140 which is configured to perform the example embodiments of the invention as described herein. The WUS module 150 may be implemented in hardware by itself of as part of the processors and/or the computer program code of the UE 110. The WUS module 140 comprising one of or both parts 140-1 and/or 140-2, which may be implemented in a number of ways. The WUS module 140 may be implemented in hardware as WUS module 140-1, such as being implemented as part of the one or more processors 120. The WUS module 140-1 may be implemented also as an integrated circuit or through other hardware such as a programmable gate array. In another example, the WUS module 140 may be implemented as WUS module 140-2, which is implemented as computer program code 123 and is executed by the one or more processors 120. Further, it is noted that the WUS modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with eNB/gNB 170 via a wireless link 111. It is noted that herein this eNB/gNB 170 as shown in FIG. 3 can be referred to as gNB 170 as in FIG. 3

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a WUS module 150 which is configured to perform example embodiments of the invention as described herein. The WUS module 150 may comprise one of or both parts 150-1 and/or 150-2, which may be implemented in a number of ways. The WUS module 150 may be implemented in hardware by itself or as part of the processors and/or the computer program code of the gNB 170. WUS module 150-1, such as being implemented as part of the one or more processors 152. The WUS module 150-1 may be implemented also as an integrated circuit or through other hardware such as a programmable gate array. In another example, the WUS module 150 may be implemented as WUS module 150-2, which is implemented as computer program code 153 and is executed by the one or more processors 152. Further, it is noted that the WUS modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 or Xn interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that a base station or network node such as the eNB/gNB 190 of FIG. 3 that forms the cell will perform the functions. The cell makes up part of the network node or base station. That is, there can be multiple cells per network node.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

It is noted that description herein supports that at least one network node, e.g. gNB 170 and/or UE 110, may communicate using, e.g., link 111 and/or link 176 and perform the functions of FIG. 4A and/or FIG. 4B as in accordance with example embodiments of the invention, but it should be clear that also the other network nodes e.g., NCE/MME/SGW/UDM/PCF/AMM/SMF/LMF/LMC 190 can perform the functions of FIG. 4A and/or FIG. 4B and use link 131 and/or link 199 to other network(s)/Internet. Further, any of these links can utilize an X2, Xn or N2 interface.

According to the design being defined as per a prior release for UE Power saving in NR WID, the WUS is applicable only to UEs in RRC Connected. WUS for paging in IDLE/INACTIVE in NR was discussed in a prior UE power saving release study item but was soon down-prioritized because it was assumed to cause network overhead due to beam sweeping. That is, the WUS transmission on every beam would be necessary when sending WUS to IDLE/INACTIVE UEs because the network does not perform beam tracking for IDLE/INACTIVE UEs, thus is unaware of the strongest/best beam.

In addition, it is noted that WUS for paging is defined for NB-IoT. The WUS-DCI has been defined for RRC Connected mode in NR. A UE configured with DRX operation on the PCell/SpCell can be configured with WUS, including a PS-RNTI for DCI format 2_6, a number of search space sets (to monitor PDCCH for detection of DCI format 2_6 on the active DL BWP of the PCell/SpCell according to a common search space), a payload size for DCI format 2_6, and a location in DCI format 2_6 of a Wake-up indication bit (if set to "0", the UE may not start the drx-onDurationTimer for the next long DRX cycle), an offset indicating a time prior to a slot where the drx-onDurationTimer would start, where the UE starts monitoring PDCCH for detection of DCI format 2_6.

A prior submission associated with the Applicant discloses a "WUS for paging" for RRC Inactive UEs in NR, according to which WUS resources are monitored by the UE in INACTIVE that triggers a UE to resume the connection WUS triggers RRC Resume procedure.

In this submission it had been proposed to use group paging, where the paging identifier is associated with multiple UEs and a UE receiving a page message containing its group paging identifier has to contact the network to find out whether it is actually being paged. This concept is also referred to as response-driven paging.

Two types of configured grants are defined for NR in Rel-15. CG Type-1, where the resource configuration and activation is provided via RRC, and CG Type-2, where the resource configuration is provided via RRC whereas activation is provided via PDCCH (DCI format 0_1 i.e. PUSCH grant that carries the transmission parameters such as MCS) addressed to the CS-RNTI (Configured Scheduling RNTI).

Figure 2:
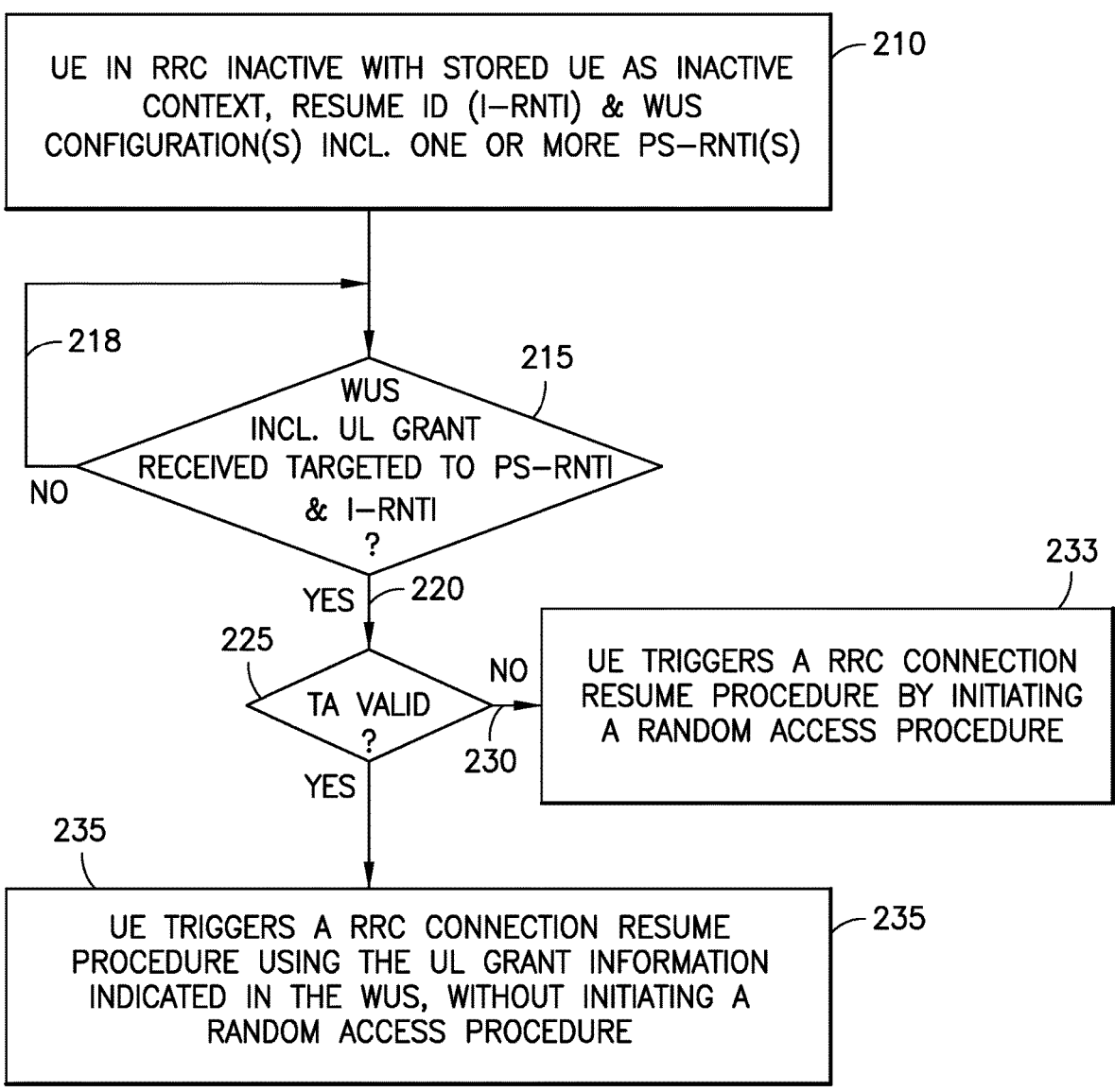
FIG. 2 shows a user equipment side flow chart illustrating aspects of example embodiments of the invention.

FIG. 2 shows a user equipment side flow chart illustrating aspects of example embodiments of the invention.

As shown in step 210 of FIG. 2 the UE is in RRC Inactive with stored UE AS inactive context, and a Resume ID (I-RNTI) and WUS Configuration(s) include one or more PS-RNTI(s). Then as shown in step 215 of FIG. 2 there is determining whether a WUS is including UL grant received and targeted to PS-RNTI and I-RNTI. As shown in step 218, if the determination of step 215 of FIG. 2 is "No" then step 215 of FIG. 2 is repeated. Else, as shown in step 220 of FIG. 2, if the determination of step 215 of FIG. 2 is "Yes" then the operations continue to step 225 of FIG. 2. As shown in step 225 of FIG. 2 there is determining whether a TA is valid. If the determination of step 225 of FIG. 2 is "No" as shown in step 230 of FIG. 2 then as shown in step 233 of FIG. 2 the UE triggers RRC connection resume procedure by initiating a random access procedure. Else if the determination of step 225 of FIG. 2 is "Yes" as shown in step 235 of FIG. 2 then as shown in step 240 of FIG. 2 the UE triggers RRC connection resume procedure using the UL grant information indicated in the WUS, without initiating a random access procedure.

Example embodiments of the invention as disclosed herein include at least example embodiments in accordance with the invention as described below:

Embodiment 1: A new WUS format for RRC_INACTIVE is introduced, which conveys a subset of the information present in an UL grant (e.g. according to DCI format 0_1, i.e. PUSCH grant), for cases where no random-access procedure is to be triggered with the connection resume.

Embodiment 2: The WUS carries an UL grant indicating information related to the UL resources to use for the RRC Resume Request transmission, including at least the physical resource blocks (PRBs) of the PUSCH.

Embodiment 3: The WUS indicates the activation of preconfigured UL resources to use for the Resume Request transmission, for a UE that had received a configured grant configuration.

Embodiment 4: The WUS-triggered activation of preconfigured UL resources is applicable only if the UE has a valid timing advance (TA).

Embodiment 5: The UE determines whether the TA is valid based on reception of WUS which is monitored in RRC INACTIVE. In one example characteristics of received WUS is compared to one or more previous successful WUS where characteristics can be e.g. signal strength, timing etc.

Embodiment 6: The UE determines whether the TA is valid based on the timing of the reception of the WUS as compared to an estimate of the timing of the WUS occasion.

Embodiment 7: The WUS indicates both the PS-RNTI (this can be group-specific) and I-RNTI (UE-specific identifier in RRC Inactive). In one example group and/or UE specific WUS resources can be configured for the UE.

Embodiment 8: The UE triggers a connection resume only if the WUS is targeted to the configured PS-RNTI (this can be group-specific) and I-RNTI (UE-specific identifier in RRC Inactive).

In one embodiment in accordance with example embodiments of the invention, the WUS indicates contention free random access resources (CFRA) for a UE, the resources can be either 4-step CFRA preamble or 2-step CFRA MSGA (preamble+PUSCH).

In one option, the 'ingredients' or subset thereto of the PDCCH order DCI for at are used for the purpose.

In one option in accordance with example embodiments of the invention, the UE promotes the TC-RNTI provided for the UE in RAR as C-RNTI (note, in CFRA for CONNECTED mode, the TC-RNTI field is ignored). In an alternative option, the NW provides UE a C-RNTI in the WUS or by dedicated signaling.

In another option in accordance with example embodiments of the invention, if the 2-step CFRA MSGA was used by the UE, the UE attempts to decode MSGB-RNTI for either for fallbackRAR or successRAR indication (note that for 2-step CFRA in CONNECTED mode, the UE decodes C-RNTI and MSGB-RNTI for fallbackRAR). The TC-RNTI (if received in fallbackRAR is promoted as C-RNTI).

In one embodiment in accordance with example embodiments of the invention, the WUS further indicates the beam(s), e.g., SSB or CSI-RS beams, in which the UL grant/pre-configured UL resources/CFRA resources are valid.

In one alternative in accordance with example embodiments of the invention, the RSRP threshold (e.g., SS-RSRP or CSI-RS-RSRP) is configured by the NW in system information or dedicated signalling (or in WUS) based on which the beams provided the dedicated resources are valid.

In accordance with example embodiments of the invention, if none of the beams provided the resources are valid, UE initiates Random Access. It is noted that in this case there can be only for particular UE(s) a UL grant and/or pre-configured UL resources. In this case, as with the CFRA resources the beam selection can be done for each RA preamble attempt.

In still another embodiment in accordance with example embodiments of the invention, the NW indicates in the WUS if the UE shall use long or short I-RNTI for the RRC resume—(this could be different from the setting in SIB which is mainly for RACH efficiency).

Example embodiments of the Invention can include for cases where no random-access procedure is to be triggered with the connection resume at least:

The WUS carries an UL grant indicating information related to the UL resources to use for the RRC Resume Request transmission, including at least the physical resource blocks (PRBs) of the PUSCH, The WUS indicates the activation of preconfigured UL resources to use for the Resume Request transmission, for a UE that had received a configured grant configuration, The WUS-triggered activation of preconfigured UL resources is applicable only if the UE has a valid timing advance (TA), The UE determines whether the TA is valid based on reception of WUS which is monitored in RRC_INAC- TIVE. In one example characteristics of received WUS is compared to one or more previous successful WUS where characteristics can be e.g. signal strength, timing etc., The UE determines whether the TA is valid based on the timing of the reception of the WUS as compared to an estimate of the timing of the WUS occasion, The WUS indicates both the PS-RNTI (this can be group-specific) and I-RNTI (UE-specific identifier in RRC Inactive). In one example group and/or UE specific WUS resources can be configured for the UE, The UE triggers a connection resume only if the WUS is targeted to the configured PS-RNTI (this can be group-specific) and I-RNTI (UE-specific identifier in RRC Inactive); and Example embodiments of the Invention can include for cases with random-access:

The WUS indicates contention free random access resources (CFRA) for a UE, the resources can be either 4-step CFRA preamble or 2-step CFRA MSGA (preamble+PUSCH), In one option, the 'ingredients' or subset thereto of the PDCCH order DCI format are used for the purpose, In one option, the UE promotes the TC-RNTI provided for the UE in RAR as C-RNTI (note, in CFRA for CONNECTED mode, the TC-RNTI field is ignored). In an alternative option, the NW provides UE a C-RNTI in the WUS or by dedicated signalling, In one option, if the 2-step CFRA MSGA was used by the UE, the UE attempts to decode MSGB-RNTI for either for fallbackRAR or successRAR indication (note that for 2-step CFRA in CONNECTED mode, the UE decodes C-RNTI and MSGB-RNTI for fallbackRAR). The TC-RNTI (if received in fallbackRAR is promoted as C-RNTI), The WUS further indicates the beam(s), e.g., SSB or CSI-RS beams, in which the UL grant/pre-configured UL resources/CFRA resources are valid, In one alternative, the RSRP threshold (e.g., SS-RSRP or CSI-RS-RSRP) is configured by the NW in system information or dedicated signalling (or in WUS) based on which the beams provided the dedicated resources are valid, If none of the beams provided the resources are valid, UE initiates Random Access—Note that this is only for the UL grant/pre-configured UL resources case as with the CFRA resources the beam selection can be done for each RA preamble attempt, The NW indicates in the WUS if the UE shall use long or short I-RNTI for the RRC resume—(this could be different from the setting in SIB which is mainly for RACH efficiency).

FIG. 4A and FIG. 4B each show a method in accordance with example embodiments of the invention which may be performed by an apparatus.

FIG. 4A illustrates operations which may be performed by a network device such as, but not limited to, a network device or user equipment such as the UE 110 as in FIG. 3. As shown in step 410 there is detecting, by a network device of a communication network, a wake-up signal related message format comprising control information, wherein the network device is in a radio resource control inactive state. Then as shown in step 420 of FIG. 4A there is, based on the detected message format, performing operations to initiate a connection resume procedure in the communication network.

In accordance with the example embodiments as described in the paragraph above, wherein the control information of the message format is using a subset of information to provide an uplink grant for use by the network device in the radio resource control inactive state to initiate the connection resume procedure in the communication network.

In accordance with the example embodiments as described in the paragraphs above, wherein the subset of information comprises indications of uplink radio resources for the uplink grant for use by the network device to perform the operations to initiate the connection resume procedure.

In accordance with the example embodiments as described in the paragraphs above, wherein the subset of information of the message format is received over a downlink control information format.

In accordance with the example embodiments as described in the paragraphs above, wherein the downlink control information format comprises at least one of a downlink control information format 0, or a downlink control information format 1, or a downlink control information format 2_6.

In accordance with the example embodiments as described in the paragraphs above, wherein the subset of information comprises an indication of at least one physical resource block of a physical uplink shared channel for the connection resume procedure request transmission.

In accordance with the example embodiments as described in the paragraphs above, wherein the message format is indicating an activation of preconfigured uplink radio resources for use to perform operations to initiate the connection resume procedure in the communication network.

In accordance with the example embodiments as described in the paragraphs above, there is determining, by the network device, a timing advance validity based on reception of the message format.

In accordance with the example embodiments as described in the paragraphs above, wherein the message format indicating the activation of preconfigured uplink radio resources is determined to be applicable to the network device based on determining the timing advance validity.

In accordance with the example embodiments as described in the paragraphs above, wherein the determining the timing advance validity is based on at least comparing characteristics of the message as received to one or more previous valid messages.

In accordance with the example embodiments as described in the paragraphs above, wherein the comparing is comparing at least one of a signal strength or a timing of the message as received to the one or more previous valid messages for the network device.

In accordance with the example embodiments as described in the paragraphs above, wherein the comparing is based on comparing a timing of reception of the message as received to an estimate of timing for a message occasion associated with the wake-up signal.

In accordance with the example embodiments as described in the paragraphs above, wherein the message format comprises an indication of at least one of a network device specific identifier or a group specific identifier.

In accordance with the example embodiments as described in the paragraphs above, there is triggering, by the network device, the connection resume operation in response to the message format being targeted to at least one of a configured network device specific identifier or a configured group specific identifier associated with the network device.

In accordance with the example embodiments as described in the paragraphs above, wherein for a case the operations to initiate the connection resume procedure comprises a random access procedure, the message format indicates contention free random access resources for the network device.

In accordance with the example embodiments as described in the paragraphs above, wherein the contention free random access resources are using at least one of a 4-step contention free random access preamble or a 2-step contention free random access MSGA.

In accordance with the example embodiments as described in the paragraphs above, the message format is using a downlink control information format of a physical downlink control channel to indicate the contention free random access resources for the network device.

In accordance with the example embodiments as described in the paragraphs above, there is promoting, by the network device, a temporary cell radio network temporary identifier, received in a random access response, as a cell radio network temporary identifier.

In accordance with the example embodiments as described in the paragraphs above, wherein the contention free random access resources are using a 2-step contention free random access MSGA, and wherein there is decoding, by the network device, a MSGB radio network temporary identifier for one of a fallback random access response or a success random access response.

In accordance with the example embodiments as described in the paragraphs above, wherein the message format comprises an indication of at least one beam in which uplink resources are valid for the connection resume procedure in the communication network.

A non-transitory computer-readable medium (Memory(ies) 125 as in FIG. 3) storing program code (Computer Program Code 123 and/or Transform Module 140-2 as in FIG. 3), the program code executed by at least one processor (Processor(s) 120 and/or Transform Module 140-1 as in FIG. 3) to perform the operations as at least described in the paragraphs above.

In accordance with an example embodiment of the invention as described above there is an apparatus comprising: means for detecting (One or more transceivers 130, Memory(ies) 125, Computer Program Code 123 and/or Transform Module 140-2, and Processor(s) 120 and/or Transform Module 140-1 as in FIG. 3), by a network device (UE 110 as in FIG. 3) of a communication network (Wireless Network 100 as in FIG. 3), a wake-up signal related message format comprising control information, wherein the network device is in a radio resource control inactive state; and means, based on the detected message format, for performing (One or more transceivers 130, Memory(ies) 125, Computer Program Code 123 and/or Transform Module 140-2, and Processor(s) 120 and/or Transform Module 140-1 as in FIG. 3) operations to initiate a connection resume procedure in the communication network.

In the example aspect of the invention according to the paragraph above, wherein at least the means for detecting and performing comprises a non-transitory computer readable medium [Memory(ies) 125 as in FIG. 3] encoded with a computer program [Computer Program Code 123 and/or Transform Module 140-2 as in FIG. 3] executable by at least one processor [Processor(s) 120 and/or Transform Module 140-1 as in FIG. 3].

FIG. 4B illustrates operations which may be performed by a network node such as, but not limited to, a network node or eNB/gNB 170 as in FIG. 3. As shown in step 450 of FIG. 4B there is determining, by a network node of a communication network, a wake-up signal related message format comprising control information for at least one network device in a radio resource control inactive state. Then as shown in step 460 of FIG. 4B there is, based on the determining, sending towards the at least one network device the message format to cause the at least one network device to perform operations to initiate a connection resume procedure in the communication network.

In accordance with the example embodiments as described in the paragraphs above, wherein the control information of the message format is using a subset of information to provide an uplink grant for the at least one network device in the radio resource control inactive state to initiate the connection resume procedure in the communication network.

In accordance with the example embodiments as described in the paragraphs above, wherein the subset of information comprises indications of uplink radio resources for the uplink grant for the at least one network device to perform the operations to initiate the connection resume procedure.

In accordance with the example embodiments as described in the paragraphs above, wherein the subset of information of the message format is using a downlink control information format.

In accordance with the example embodiments as described in the paragraphs above, wherein the uplink radio resources for the at least one network device are identified in the subset of information using the downlink control information format comprises at least one of a downlink control information format 0, a downlink control information format 1, or a downlink control information format 2_6.

In accordance with the example embodiments as described in the paragraphs above, wherein the subset of information comprises an indication of at least one physical resource block of a physical uplink shared channel for the connection resume procedure request transmission.

In accordance with the example embodiments as described in the paragraphs above, wherein the message format is indicating an activation of preconfigured uplink radio resources for use to perform operations to initiate the connection resume procedure in the communication network.

In accordance with the example embodiments as described in the paragraphs above, wherein the message format indicating the activation of preconfigured uplink radio resources is determined to be applicable to the at least one network device based on a timing advance validity of the at least one network device.

In accordance with the example embodiments as described in the paragraphs above, wherein the message format comprises an indication of at least one of a network device specific identifier or a group specific identifier.

In accordance with the example embodiments as described in the paragraphs above, wherein the message format is targeted to at least one of a configured network device specific identifier or a configured group specific identifier associated with the at least one network device.

In accordance with the example embodiments as described in the paragraphs above, wherein for a case the operations to initiate the connection resume procedure require a random access procedure, the message format indicates contention free random access resources for the at least one network device.

In accordance with the example embodiments as described in the paragraphs above, wherein the contention free random access resources are using at least one of a 4-step contention free random access preamble or a 2-step contention free random access MSGA.

In accordance with the example embodiments as described in the paragraphs above, the message format is using one of a downlink control information format or a physical downlink control channel to indicate the contention free random access resources for the at least one network device.

In accordance with the example embodiments as described in the paragraphs above, wherein the message format comprises an indication of at least one beam in which uplink resources are valid for the connection resume procedure in the communication network.

A non-transitory computer-readable medium (Memory(ies) 155 as in FIG. 3) storing program code (Computer Program Code 153 and/or Transform Module 150-2 as in FIG. 3), the program code executed by at least one processor (Processor(s) 152 and/or Transform Module 150-1 as in FIG. 3) to perform the operations as at least described in the paragraphs above.

In accordance with an example embodiment of the invention as described above there is an apparatus comprising: means for determining (Remote Radio Head 195, Memory(ies) 155, Computer Program Code 153 and/or Transform Module 150-2, and Processor(s) 152 and/or Transform Module 150-1 as in FIG. 3), by a network node (eNB/gNB 170 as in FIG. 3 of a communication network (Wireless Network 100 as in FIG. 3), a message format for at least one network device in a radio resource control inactive state; and means, based on the determining, for sending (Remote Radio Head 195, Memory(ies) 155, Computer Program Code 153 and/or Transform Module 150-2, and Processor(s) 152 and/or Transform Module 150-1 as in FIG. 3) towards the at least one network device (UE 110 as in FIG. 3) the message format to cause the at least one network device to perform operations to initiate a connection resume procedure in the communication network.

In the example aspect of the invention according to the paragraph above, wherein at least the means for determining and sending comprises a non-transitory computer readable medium [Memory(ies) 155 as in FIG. 3] encoded with a computer program [Computer Program Code 153 and/or Transform Module 150-2 as in FIG. 3] executable by at least one processor [Processor(s) 152 and/or Transform Module 150-1 as in FIG. 3].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It is submitted that advantages of operations in accordance with example embodiments of the invention as disclosed herein can produce advantages including that Paging with WUS can be used to trigger a resume using network-scheduled resources, without performing a random access procedure. Further this allows achievement of both UE power saving (due to avoiding RACH procedure) and network efficiency (including saving PRACH resources while assigning radio resources for the resume on the fly).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A user equipment, comprising: at least one processor; and at least one memory storing instructions that, when executed by the at least one processor, cause the user equipment at least to:

detect a wake-up signal related message format comprising control information, wherein the user equipment is in a radio resource control inactive state; and based on the detected message format, perform operations to initiate a connection resume procedure in a communication network, wherein the control information of the message format is using a subset of information to provide an uplink grant for use by the user equipment in the radio resource control inactive state to initiate the connection resume procedure in the communication network, wherein the subset of information of the message format is received over a downlink control information format, wherein the downlink control information format comprises a downlink control information format 0, a downlink control information format 1, and a downlink control information format 2_6, wherein the message format comprises an indication of a network device specific identifier and a group specific identifier, wherein the user equipment is further caused to:

trigger the connection resume operation in response to the message format being targeted to a configured network device specific identifier and a configured group specific identifier associated with the user equipment, wherein the user equipment is further caused to:

determine a timing advance validity based on reception of the message format, wherein the message format indicating the activation of preconfigured uplink radio resources is determined to be applicable to the user equipment based on determining the timing advance validity, wherein the determining the timing advance validity is based on at least comparing characteristics of the message as received to one or more previous valid messages, wherein the comparing is comparing at least one of a signal strength or a timing of the message as received to the one or more previous valid messages for the network device, wherein the comparing is based on comparing a timing of reception of the message as received to an estimate of timing for a message occasion associated with the wake-up signal.

2. The user equipment of claim 1, wherein the wake up signal-triggered activation of preconfigured uplink resources is applicable only if the user equipment has a valid timing advance, and the user equipment is further caused to:

determine whether the timing advance is valid based on one of reception of the wake up signal which is monitored in RRC INACTIVE or the timing of the reception of the wake up signal as compared to an estimate of the timing of the wake up signal occasion, wherein the wake up signal indicates both a configured power saving-radio network temporary identifier, which is group-specific, and an inactive-radio network temporary identifier.

3. The user equipment of claim 2, wherein the user equipment is further caused to trigger a connection resume only if the wake up signal is targeted to the configured power saving-radio network temporary identifier and inactive-radio network temporary identifier.

4. The user equipment of claim 1, wherein for a case wherein the operations to initiate the connection resume procedure comprise a random access procedure, the message format indicates contention free random access resources for the user equipment, wherein the contention free random access resources are using a 4-step contention free random access preamble or a 2-step contention free random access Message A including a preamble and a physical uplink shared channel, and there is decoding of a Message B radio network temporary identifier for one of a fallback random access response or a success random access response.

5. The user equipment of claim 4, wherein if the 2-step contention free random access Message A was used, then the user equipment is further caused to attempt to decode the Message B radio network temporary identifier for either for fallback re-authorization request or for success re-authorization request, wherein the message format comprises an indication of at least one beam in which uplink resources are valid for the connection resume procedure in the communication network, wherein the at least one beam comprises at least one synchronization signal block or channel-state information reference signal beam, and wherein a reference signal received power threshold is configured in system information or dedicated signalling based on the at least one beam.

6. A method, comprising:

detecting, by a user equipment of a communication network, a wake-up signal related message format comprising control information, wherein the network device is in a radio resource control inactive state; and based on the detected message format, performing operations to initiate a connection resume procedure in the communication network, wherein the control information of the message format is using a subset of information to provide an uplink grant for use by the user equipment in the radio resource control inactive state to initiate the connection resume procedure in the communication network, wherein the subset of information of the message format is received over a downlink control information format, wherein the downlink control information format comprises a downlink control information format 0, a downlink control information format 1, and a downlink control information format 2_6, wherein the message format comprises an indication of a network device specific identifier and a group specific identifier, wherein the message format comprises an indication of a network device specific identifier and a group specific identifier, wherein the message format further comprises an activation of preconfigured uplink radio resources for use to perform operations to initiate the connection resume procedure in the communication network, wherein the method further comprises:

triggering the connection resume operation in response to the message format being targeted to a configured network device specific identifier and a configured group specific identifier associated with the user equipment, wherein the method further comprises:

determining a timing advance validity based on reception of the message format, wherein the message format indicating the activation of preconfigured uplink radio resources is determined to be applicable to the user equipment based on determining the timing advance validity, wherein the determining the timing advance validity is based on at least comparing characteristics of the message as received to one or more previous valid messages, wherein the comparing is comparing at least one of a signal strength or a timing of the message as received to the one or more previous valid messages for the network device, wherein the comparing is based on comparing a timing of reception of the message as received to an estimate of timing for a message occasion associated with the wake-up signal.

7. The method of claim 6, wherein the control information of the message format is using a subset of information to provide an uplink grant for use by the network device in the radio resource control inactive state to initiate the connection resume procedure in the communication network.

* * * * *